(12) United States Patent
Yao

(10) Patent No.: US 10,365,723 B2
(45) Date of Patent: Jul. 30, 2019

(54) KEYBOARD DEVICE WITH BUILT-IN SENSOR AND LIGHT SOURCE MODULE

(71) Applicant: Bing-Yang Yao, Taipei (TW)

(72) Inventor: Bing-Yang Yao, Taipei (TW)

( * ) Notice: Subject to any disclaimer, the term of this patent is extended or adjusted under 35 U.S.C. 154(b) by 69 days.

(21) Appl. No.: 15/581,639

(22) Filed: Apr. 28, 2017

(65) Prior Publication Data

US 2017/0315623 A1 Nov. 2, 2017

(30) Foreign Application Priority Data

Apr. 29, 2016 (TW) .............................. 105113620 A

(51) Int. Cl.
*G06F 3/02* (2006.01)
*H05B 37/02* (2006.01)

(52) U.S. Cl.
CPC ............ *G06F 3/021* (2013.01); *G06F 3/0219* (2013.01); *H05B 37/0218* (2013.01); *Y02B 20/46* (2013.01)

(58) Field of Classification Search
None
See application file for complete search history.

(56) References Cited

U.S. PATENT DOCUMENTS

| | | | | |
|---|---|---|---|---|
| 6,092,903 A * | 7/2000 | Higgins, Jr. | .......... | G06F 3/0202 341/22 |
| 6,336,727 B1 * | 1/2002 | Kim | ...................... | G06F 1/1616 345/161 |
| 8,928,590 B1 | 1/2015 | El Dokor | | |
| 2003/0146903 A1 | 8/2003 | Yi | | |
| 2006/0164378 A1 * | 7/2006 | Phillips | .................. | G06F 1/1616 345/102 |
| 2006/0170669 A1 * | 8/2006 | Walker | ................... | G06F 3/0362 345/418 |
| 2008/0036732 A1 * | 2/2008 | Wilson | ..................... | G06F 3/017 345/156 |
| 2008/0106523 A1 * | 5/2008 | Conrad | ................... | G06F 3/033 345/173 |
| 2009/0109649 A1 * | 4/2009 | Harris | .................... | G06F 1/1616 362/23.03 |
| 2010/0141458 A1 * | 6/2010 | Chiang | ................. | G06F 1/3215 340/600 |
| 2011/0038114 A1 * | 2/2011 | Pance | ................... | G06F 1/1616 361/679.4 |
| 2012/0249587 A1 | 10/2012 | Anderson et al. | | |
| 2014/0035818 A1 * | 2/2014 | Matsuoka | ............. | G06F 1/3231 345/168 |
| 2014/0231635 A1 * | 8/2014 | Kerness | ................ | G01S 17/026 250/226 |
| 2014/0267029 A1 * | 9/2014 | Govil | ................. | G06K 9/00355 345/157 |

(Continued)

*Primary Examiner* — Kent W Chang
*Assistant Examiner* — Nathaniel P Brittingham

(57) ABSTRACT

A keyboard device includes a base, a plurality of keys, a light source module, a first sensor, a second sensor, and a control module. An ambient luminance of the plurality of keys is detected by using the first sensor. When the ambient luminance is less than an ambient luminance at which the second sensor can capture a required image, the control module turns on the light source module to provide a light source for the plurality of keys to improve the ambient luminance, so that the second sensor to can clearly capture the required image and obtain the required data by means of analysis.

15 Claims, 5 Drawing Sheets

(56) References Cited

U.S. PATENT DOCUMENTS

| | | | | |
|---|---|---|---|---|
| 2014/0282868 A1* | 9/2014 | Sheller | ............ | G06F 21/31 |
| | | | | 726/3 |
| 2014/0361994 A1* | 12/2014 | Lee | ............ | G06F 3/0202 |
| | | | | 345/169 |
| 2015/0062004 A1* | 3/2015 | Rafii | ............ | G06F 3/017 |
| | | | | 345/156 |
| 2015/0124100 A1* | 5/2015 | McRory | ............ | H04N 7/185 |
| | | | | 348/151 |
| 2015/0302653 A1* | 10/2015 | Algreatly | ............ | G06F 3/0488 |
| | | | | 345/633 |
| 2015/0325391 A1* | 11/2015 | Brown | ............ | G06F 3/0202 |
| | | | | 362/23.03 |
| 2016/0171297 A1* | 6/2016 | Qin | ............ | G06F 3/017 |
| | | | | 382/187 |
| 2016/0210452 A1* | 7/2016 | Pahud | ............ | G06F 21/32 |
| 2017/0315623 A1* | 11/2017 | Yao | ............ | H05B 37/0218 |

\* cited by examiner

KEYBOARD DEVICE WITH BUILT-IN SENSOR AND LIGHT SOURCE MODULE

CROSS-REFERENCE TO RELATED APPLICATION

This non-provisional application claims priority under 35 U.S.C. § 119(a) to Patent Application No. 105113620 filed in Taiwan, R.O.C. on Apr. 29, 2016, the entire contents of which are hereby incorporated by reference.

BACKGROUND

Technical Field

The present invention relates to a data typing device of a computer, a mobile device, and/or a virtual reality (VR) display device, and in particular, to a keyboard with a built-in sensor.

Related Art

Prior art document 1: The American patent application having a Publication No. 2012/0249587 A1 (inventor: Glen et al.) and entitled "KEYBOARD AVATAR FOR HEADS UP DISPLAY (HUD)" discloses a head-up display (HUD) or a head-mounted display (HMD), configured to view an image of an input device connected to a computer and an image representing a finger of a user. In Prior art document 1, a camera is utilized to capture images of the input device and the finger of the user, to present the images on the head-up display or the head-mounted display, as shown in FIG. 3A of Prior art document 1. Alternatively, after the images are converted, representative images (a finger/hand image 602, and a keyboard image 603) are presented on the head-up display/head-mounted display, as shown in FIG. 3B of Prior art document 1.

Prior art document 2: The American patent having a U.S. Pat. No. 8,928,590 B1 (inventor: Tarek) and entitled "GESTURE KEYBOARD METHOD AND APPARATUS" discloses a keyboard capable of capturing an operating gesture. Operating gestures of a user within an operating gesture scope (that is, a visible scope of a camera) are captured by using a pair of cameras mounted on the keyboard. Interaction with a system may be performed after the gestures are recognized.

Prior art document 3: The American patent application having a Publication No. 2003/0146903 A1 (inventor: Leland et al.) and entitled "WIRED KEYBOARD WITH BUILT-IN WEB CAMERA" discloses a keyboard integrated with a web camera is disclosed. The web camera is directly integrated with a front end of the keyboard, to help a user use a working space more effectively.

In Prior art document 1, an actual image or a representative image after conversion is displayed on the head-up display/head-mounted display. When an ambient light source is insufficient, a problem that it is difficult to identify an image captured by a camera (for example, an image is totally black in darkness), or even a problem that an image, because of being unclear, cannot be converted into a representative image, is likely to occur. The operating gesture scope in Prior art document 2 is approximately four inches above the keyboard, and the operating gestures are irrelevant to keys on a physical keyboard and therefore, make no contribution to accelerating data typing performed by the user by using the physical keyboard, and cannot resolve the problem that a camera cannot capture an image when an ambient light source is insufficient. The web camera in Prior art document 3 is used for a web video, and is irrelevant to assisting data typing performed by a user by using a physical keyboard. Further, Prior art document 3 does not disclose how to resolve the problem of an insufficient ambient light source. Therefore, the prior art indeed needs to be improved to resolve the problem of the insufficient ambient light source by using an automatic supplemental lighting technology. When the present invention is applied to a head-up display, a head-mounted display, or a virtual reality display (VR) device, even if in a dark environment in which no lamp is turned on, a user can still type data with a keyboard by means of the automatic supplemental lighting technology in the present invention.

SUMMARY

Based on the above, in an embodiment of the present invention, a keyboard device with a built-in sensor and light source module is proposed, so that a first sensor automatically detects whether an ambient light source is sufficient, a light source module is turned on to supplement light when the light source is insufficient, to help a second sensor to obtain finger position data. The keyboard device includes a base, a plurality of keys, at least one light source module, a first sensor, a second sensor, and a control module.

The base includes an accommodating space. The plurality of keys is disposed in the accommodating space of the base. The at least one light source module is disposed on the base, and is configured to provide a light source for the plurality of keys. The first sensor is disposed on the base, and is configured to detect an ambient luminance of the plurality of keys. The second sensor is disposed on the base and faces the plurality of keys, and is configured to detect and obtain an "operating position data". The control module is disposed in the accommodating space of the base, and is electrically connected to the plurality of keys, the at least one light source module, the first sensor, and the second sensor. When determining that the ambient luminance detected by the first sensor is equal to or greater than the preset ambient luminance, the control module turns on the second sensor and receives the operating position data of the second sensor, and when determining that the ambient luminance detected by the first sensor is less than the preset ambient luminance, the control module turns on the at least one light source module to provide the light source for the plurality of keys.

The first sensor can detect an ambient luminance of an environment in which the plurality of keys is located. When the luminance of the environment in which the plurality of keys is located is insufficient, the second sensor cannot generate the operating position data by capturing complete relative position data of a finger of a user on the plurality of keys. Therefore, the ambient luminance is detected by using the first sensor. When the ambient luminance is less than an ambient luminance at which the second sensor can capture a required image, the control module turns on the light source module to provide a light source for the plurality of keys to improve the ambient luminance, so that the second sensor to can clearly capture the required image and obtain the required data by means of analysis.

In another embodiment of the present invention, a keyboard device is provided, including: a first keyboard, a second keyboard, at least one first light source module, at least one second light source module, at least one first sensor, a second sensor, a third sensor, and a control module.

The first keyboard includes: a first base that includes a first accommodating space, and a plurality of first keys. The plurality of first keys is disposed in the first accommodating space. The second keyboard includes: a second base that includes a second accommodating space, and a plurality of second keys. The plurality of second keys is disposed in the second accommodating space. The at least one first light source module is disposed on the first base, and is configured to provide a first light source for the plurality of first keys. The at least one second light source module is disposed on the second base, and is configured to provide a second light source for the plurality of second keys. The at least one first sensor is disposed on the first base or the second the base, and is configured to detect an ambient luminance of the plurality of first keys and the plurality of second keys. The second sensor is disposed on the first base and faces the plurality of first keys, and is configured to detect and obtain first operating position data. The third sensor is disposed on the second base and faces the plurality of second keys, and is configured to detect and obtain second operating position data.

The control module is disposed in the first accommodating space or the second accommodating space, and is electrically connected to the plurality of first keys, the plurality of second keys, the at least one first light source module, the at least one second light source module, the at least one first sensor, the second sensor, and the third sensor. When determining that the ambient luminance detected by the at least one first sensor is equal to or greater than a preset ambient luminance, the control module turns on the second sensor and the third sensor, and receives the first operating position data of the second sensor and the second operating position data of the third sensor, and when determining that the ambient luminance detected by the at least one first sensor is less than the preset ambient luminance, the control module turns on the at least one first light source module to provide the first light source for the plurality of first keys, or turns on the at least one second light source module to provide the second light source for the plurality of second keys.

In this way, when left and right split keyboards (may be the foregoing first keyboard and second keyboard) are used, an ambient luminance of either of the two keyboards may be detected by using a first sensor, or a first sensor may be disposed on each of the left keyboard and the right keyboard, to respectively detect an ambient luminance of a plurality of keys on the left keyboard and an ambient luminance of a plurality of keys on the right key board. When the ambient luminance detected by the first sensor is less than an ambient luminance at which second sensors respectively located on the left keyboard and the right keyboard can capture required images and obtain required data, the control module turns on light source modules to provide light sources for the plurality of keys on the left keyboard and the plurality of keys on the right keyboard, to improve the ambient luminance, so that the second sensors can clearly capture the required images and obtain the required data by means of analysis.

The following describes in detail the features and the advantages of the present invention in implementation manners, the content of the descriptions enables any person skilled in the art to learn technical content of the present invention and implement the content, and any person skilled in the art may easily understand the objectives and the advantages of the present invention according to the content, the protection scope of this application and the figures disclosed in the specification.

BRIEF DESCRIPTION OF THE DRAWINGS

The present invention will become more fully understood from the detailed description given herein below for illustration only, and thus are not limitative of the present invention, and wherein.

DETAILED DESCRIPTION

The present invention is applied to, but is not limited to, a computing device such as a personal computer (PC/Mac), a notebook computer (Laptop/Portable Computer), a smartphone, a tablet computer, a smart television, a head-up display/head-mounted display/virtual reality display device, or a video game console (or TV Game Console), which can be communicably connected to keyboard devices 10, 20, 30, and 40 in the following. A manner of the communicable connection may be a wireless communication manner or a wired communication manner.

The figures in this specification are used for describing functions and technical features of the present invention, but are not intended to limit appearance and modeling of the present invention.

Figure 1:
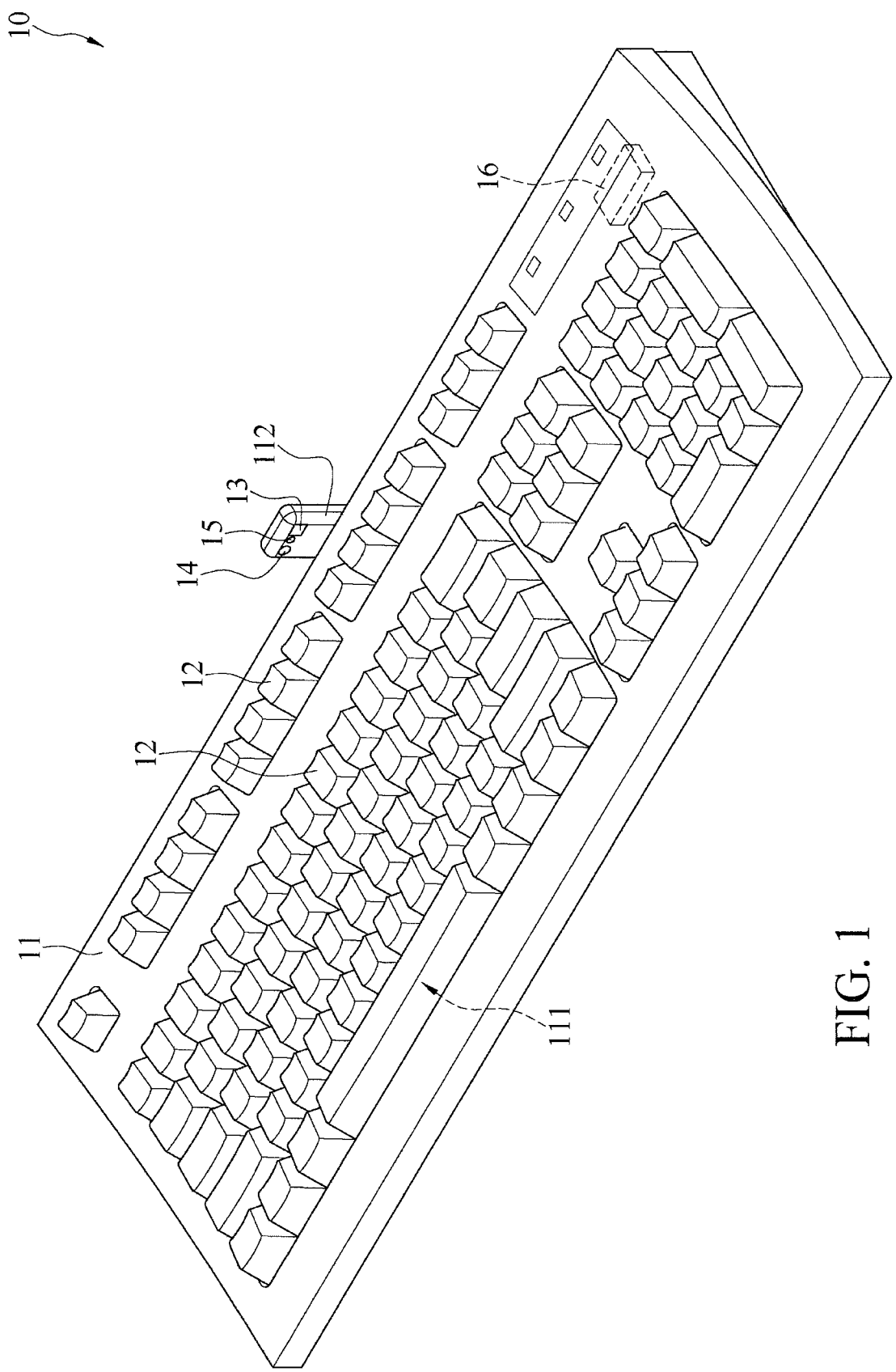
FIG. 1 is a schematic diagram of a keyboard device according to a first embodiment of the present invention.

Referring to FIG. 1, FIG. 1 is a schematic diagram of a keyboard device according to a first embodiment of the present invention. A keyboard device 10 in this embodiment includes a base 11, a plurality of keys 12, a light source module 13, a first sensor 14, a second sensor 15, and a control module 16. The base 11 includes an accommodating space 111 for accommodating the plurality of keys 12. The keyboard device 10 shown in FIG. 1 accommodates the keys 12 having different functions by using the openings of multiple areas. This is an existing common technical means, and is not described in detail herein.

The light source module 13 is disposed on the base 11, and is configured to provide a light source for the plurality of keys 12. As shown in FIG. 1, a holder 112 for accommodating the light source module 13 is disposed on an outer side at a central position of an upper longer side of the base 11. The light source module 13 is disposed facing the plurality of keys 12, to provide a light source required by the plurality of keys 12. In this embodiment, to provide the light source for all of the keys 12, a height at which the light source module 13 is disposed is higher than those of all of the keys, so that the light source emitted by the light source module 13 can be irradiated onto all keys 12, or a sufficient ambient luminance is generated in the areas in which all of the keys 12 are located. In addition, the light source module 13 may be an LED element, and can emit visible light. In another implementation aspect, the light source module may be an LED element capable of emitting infrared light. No limitation is imposed herein in the present invention.

The first sensor 14 and the second sensor 15 are also disposed on the base 11, and face the plurality of keys 12. In this embodiment, the first sensor 14 and the second sensor 15 are also disposed on the holder 112, and face the plurality of keys 12. The first sensor 14 is configured to detect an ambient luminance of the plurality of keys 12. The second sensor 15 is configured to detect and obtain an "operating position data" (that is, a photo image, in some embodiments). In this embodiment, the holder 112 is disposed on the outer side at the central position of the upper longer side of the base 11, so that the light source module 13, the first sensor 14, and the second sensor 15 can provide the light source for the plurality of keys 12 in a left-right symmetric manner or perform detection in a left-right symmetric manner. However, no limitation is imposed herein in the present invention. In another implementation aspect, the holder 112 may be disposed at any position on any side of the base 11, as long as a light source can be provided for the plurality of keys 12, and the plurality of keys 12 can be detected or irradiated. In addition, in this embodiment, the light source module 13, the first sensor 14, and the second sensor 15 are all disposed on the same holder 112. However, no limitation is imposed herein in the present invention. The light source module 13, the first sensor 14, and the second sensor 15 may also be respectively disposed at any position of the base 11, or every two may be disposed at any position of the base 11. Alternatively, the first sensor 14 is disposed at any position of the base 11, and the light source module 13 and the second sensor 15 are disposed on the same holder 112.

In this embodiment, the first sensor 14 is a luminance sensor, or referred to as an ambient light sensor. The first sensor 14 can detect a luminance of an environment in which the plurality of keys 12 is located. The first sensor 14 is configured to determine whether the luminance of the environment in which the plurality of keys 12 is located is sufficient, to enable the second sensor 15 to detect and obtain required data.

In this embodiment, the second sensor 15 is a camera (or a camera module). The operating position data detected and obtained by the second sensor 15 is an image obtained by photographing. The image is transmitted to a computing device end (not shown in the figure) by the control module 16. An analysis and calculation module additionally disposed on the computing device end analyzes the image, to obtain the "data of relative positions between a finger (or fingers) of a user and the keys 12" (hereinafter referred to as the "relative position data"). Because the second sensor 15 can correctly determine the relative position data only if all of the keys 12 are photographed, a position at which the second sensor 15 is disposed needs to be higher than a surface of any key 12.

The control module 16 is disposed in the accommodating space 111 of the base 11, and electrically connected to the plurality of keys 12, the light source module 13, the first sensor 14, and the second sensor 15. The control module 16 may be located at any position in the accommodating space 111 of the base 11. No limitation is imposed herein in the present invention. When receiving the ambient luminance detected by the first sensor 14 and determining that the ambient luminance detected by the first sensor 14 is equal to or greater than a preset ambient luminance, the control module 16 turns on the second sensor 15 and receives the operating position data of the second sensor 15. When determining that the ambient luminance detected by the first sensor 14 is less than the preset ambient luminance, the control module 16 turns on the light source module 13 to provide the light source for the plurality of keys 12.

The preset ambient luminance herein is an ambient luminance at which the second sensor 15 can clearly detect and obtain the operating position data. The preset ambient luminance may be specified in advance, and then pre-stored in the control module 16 to facilitate subsequent comparison and determining. The operating position data received by the control module 16 is merely an image, which needs to be analyzed by the computing device end.

Before starting to obtain the operating position data, the control module 16 first determines whether the ambient luminance detected by the first sensor 14 is equal to or greater than the preset ambient luminance. If the ambient luminance detected by the first sensor 14 is equal to or greater than the preset ambient luminance, it indicates that the second sensor 15 can clearly detect and obtain the operating position data. In this case, the second sensor 15 is turned on to start photographing and detect and obtain the operating position data. When the control module 16 determines that the ambient luminance detected by the first sensor 14 is less than the preset ambient luminance, it indicates that the image photographed by the second sensor 15 may be excessively dark from which the operating position data cannot be detected and obtained, so that the control module 16 turns on the light source module 13 to provide the light source for the plurality of keys 12, to improve the ambient luminance of the areas in which the plurality of keys 12 is located.

In this way, the foregoing keyboard device 10 can resolve the problem of the insufficient ambient light source by using an automatic supplemental lighting technology. When the foregoing keyboard is applied to a head-up display, a head-mounted display, or a virtual reality display (VR) device, even if in a dark environment in which no lamp is turned on, a user can still type data with a keyboard by means of the automatic supplemental lighting technology in the this embodiment.

In this embodiment, when the second sensor 15 is already turned on, keeps photographing, and detects and obtains the operating position data, the control module 16 can know whether the operating position data includes the relative position data (refer to description of FIG. 5 below for details). When the operating position data does not include the relative position data, it indicates that the user does not continue operating the keyboard device 10. In this case, the control module 16 turns off the second sensor 15, and the second sensor 15 stops photographing or detecting and obtaining the operating position data. In this way, the second sensor 15 may be turned off automatically when the user does not operate the keyboard device 10, or has not operated the keyboard device 10 for an idle time, to save power.

In addition, when the light source module 13 is in a turn-on state, the first sensor 14 keeps detecting an ambient luminance. When the ambient luminance detected by the first sensor 14 is greater than the preset ambient luminance, the control module 16 turns off the light source module 13. In this case, the ambient luminance has been improved, for example, the user has turned on an indoor lamp, and the ambient luminance detected by the first sensor 14 is greater than the preset ambient luminance, so that assistance from the light source of the light source module 13 is not needed. In this case, the control module 16 automatically turns off the light source module 13, to save power.

Figure 2:
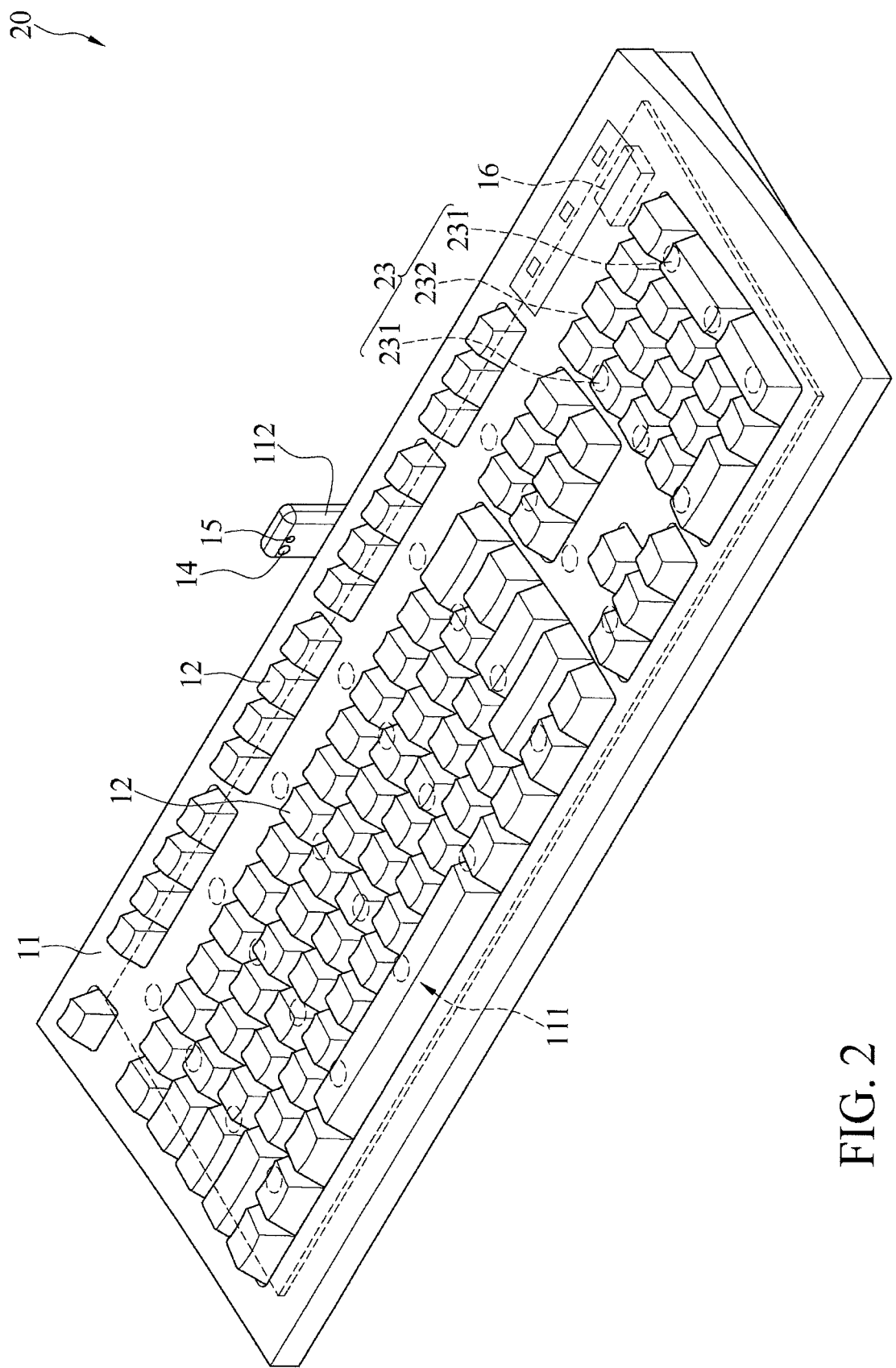
FIG. 2 is a schematic diagram of a keyboard device according to a second embodiment of the present invention.

Next, referring to FIG. 2, FIG. 2 is a schematic diagram of a keyboard device 20 according to a second embodiment of the present invention. Elements and structures in this embodiment that are the same as those in the first embodiment are represented by using the same element symbols, and are not described in detail herein again. This embodiment is different from the first embodiment in that a keyboard device 20 in this embodiment includes a plurality of light source modules, that is, light source modules 23, and the plurality of light source modules 23 is disposed in an accommodating space 111 of a base 11 and below the plurality of keys 12, and faces the plurality of keys 12, to provide a light source. The plurality of light source modules 23 in this embodiment is a plurality of LED elements 231 disposed on a circuit board 232 and below the keys 12. In another implementation aspect, the plurality of light source modules may further be LED elements disposed beneath each keycap, or may be a plurality of LED elements disposed on a side of the accommodating space of the base, and enables, in cooperation with elements such as a light guide plate and a reflective plate, a light source to be emitted from the accommodating space toward the keys 12.

In this embodiment, when the control module 16 determines that an ambient luminance detected by the first sensor 14 is less than a preset ambient luminance, the control module 16 successively turns on at least one of the plurality of light source modules 23, until the control module 16 determines that the ambient luminance detected by the first sensor 14 is equal to or greater than the preset ambient luminance, or the plurality of light source modules 23 is all turned on. That is, when determining that the current ambient luminance is insufficient, the control module 16 may first control one or more light source modules 23 to be turned on, to provide the light source. Next, the control module 16 keeps receiving an ambient luminance detected by the first sensor 14 and determining the ambient luminance detected by the first sensor 14, and if the ambient luminance is still insufficient, the control module 16 further turns on one or more light source modules 23. The control module 16 does not stop further enabling light source modules 23 until determining that the ambient luminance detected by the first sensor 14 is equal to or greater than the preset ambient luminance. Alternatively, the control module 16 successively turns on light source modules 23 until all light source modules 23 are turned on.

In this way, the control module 16 determines and turns on only light source modules 23 sufficient for providing a required ambient luminance without simultaneously turning on all light source modules 23 each time an ambient luminance is insufficient. Therefore, the keyboard device 20 in this embodiment only needs to turn on a sufficient number of light source modules 23, thereby achieving an effect of power saving.

Figure 3:
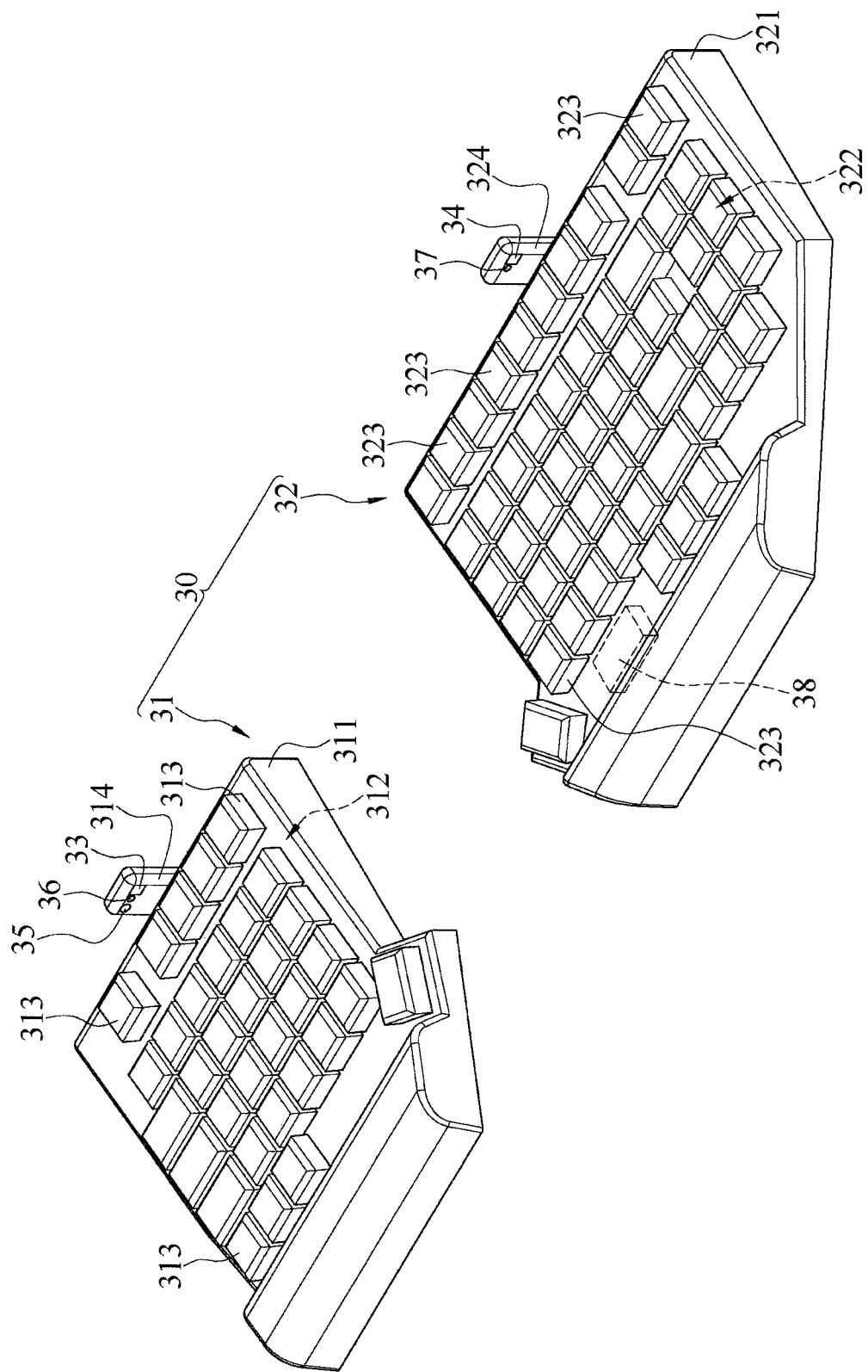
FIG. 3 is a schematic diagram of a keyboard device according to a third embodiment of the present invention.

Referring to FIG. 3, FIG. 3 is a schematic diagram of a keyboard device 30 according to a third embodiment of the present invention. A keyboard device 30 in this embodiment includes a first keyboard 31, a second keyboard 32, a first light source module 33, a second light source module 34, a first sensor 35, a second sensor 36, a third sensor 37, and a control module 38. The first keyboard 31 includes: a first base 311 that includes a first accommodating space 312, and a plurality of first keys 313. The plurality of first keys 313 is disposed in the first accommodating space 312. The second keyboard 32 includes: a second base 321 that includes a second accommodating space 322, and a plurality of second keys 323. The plurality of second keys 323 is disposed in the second accommodating space 322. In this embodiment, the first keyboard 31 and the second keyboard 32 are respectively a left keyboard and a right keyboard that can be used in pair and that are formed by dividing keys on a common keyboard into two groups. However, no limitation is imposed herein in the present invention. Alternatively, the first keyboard and the second keyboard may be a combination of a letter symbol keyboard and a numeric keyboard.

The first light source module 33 is disposed on the first base 311, and is configured to provide a first light source for the plurality of first keys 313. As shown in FIG. 3, a first holder 314 for accommodating the first light source module 33 is disposed on an outer side at a central position of an upper longer side of the first base 311. The first light source module 33 is disposed facing the plurality of first keys 313, to provide the light source required by the plurality of first keys 313. In this embodiment, to provide the light source for all of the first keys 313, a height of a position of the first light source module 33 is higher than those of all keys, so that the light source emitted by the first light source module 33 can be irradiated onto all of the first keys 313, or a sufficient ambient luminance can be generated in areas in which all of the first keys 313 are located.

Similarly, the second light source module 34 is disposed on the second base 321, and is configured to provide a second light source for the plurality of second keys 323. As shown in FIG. 3, a second holder 324 for accommodating the second light source module 34 is disposed on an outer side at a central position of an upper longer side of the second base 321. The second light source module 34 is disposed facing the plurality of second keys 323, to provide the light source required by the plurality of second keys 323. In this embodiment, to provide the light source for all of the second keys 323, a height of a position of the second light source module 34 is higher than those of all of the keys, so that the light source emitted by the second light source module 34 can be irradiated onto all of the second keys 323, or a sufficient ambient luminance can be generated in areas in which all of the second keys 323 are located.

The first sensor 35 is disposed on the first base 311, and is configured to detect an ambient luminance of the plurality of first keys 313. As shown in FIG. 3, the first sensor 35 is disposed on the first holder 314, and faces the plurality of first keys 313. Because the first sensor 35 does not need to face all of the keys, and only needs to detect a single point, in other embodiments, the first sensor 35 may be disposed at another position of the first base 311 or the second base 321, for example, in a plane space (less than a height of a key) near any key. In addition, the first keyboard 31 is usually not excessively distant from the second keyboard 32, and an ambient luminance of the first keyboard 31 is usually not excessively different from the second keyboard 32. Therefore, in this embodiment, the first sensor 35 (detecting only the ambient luminance of the first keyboard 31) enables the control module 16 to simultaneously control the first light source module 33 and the second light source module 34.

In this embodiment, the first sensor 35 is a luminance sensor, or referred to as an ambient light sensor. The first sensor 35 can detect a luminance of an environment in which the plurality of first keys 313 is located. In other embodiments, the first sensor 35 is disposed on the second base 321 of the second keyboard 32, to detect a luminance of an environment in which the plurality of second keys 323 is located. The first sensor 35 is configured to determine whether the luminance of the environment, in which the plurality of first keys 313 (when disposed on the first keyboard 31) or the plurality of second keys 323 (when disposed on the second keyboard 32) is located, is sufficient, to enable the second sensor 36 and the third sensor 37 to detect and obtain required data.

The second sensor 36 is disposed on the first base 311, and faces the plurality of first keys 313. In this embodiment, both the second sensor 36 and the first light source module 33 are disposed on the first holder 314, and face the plurality of first keys 313. The second sensor 36 is configured to detect and obtain first operating position data. In this embodiment, the first holder 314 is disposed on the outer side of the central position on an upper side of the first base 311, so as to enable the first light source module 33 and the second sensor 36 to provide the light source for the plurality of first keys 313 in a left-right symmetric manner or perform detection in a left-right symmetric manner. However, no limitation is imposed herein in the present invention. In another implementation aspect, the first holder 314 may be disposed at any position on any side of the first base 311, as long as the light source can be provided for the plurality of first keys 313, and the plurality of first keys 313 can be detected and irradiated. In addition, in this embodiment, both the first light source module 33 and the second sensor 36 are disposed on the same first holder 314. However, no limitation is imposed herein in the present invention. The first light source module 33 and the second sensor 36 may further be respectively disposed at any position of the first base 311.

The third sensor 37 is disposed on the second base 321, and faces the plurality of second keys 323. In this embodiment, both the third sensor 37 and the second light source module 34 are disposed on the second holder 324, and face the plurality of second keys 323. The third sensor 37 is configured to detect and obtain second operating position data. In this embodiment, the second holder 324 is disposed on the outer side of the central position on the upper side of the second base 321, so that the second light source module 34 and the third sensor 37 can provide the light source for the plurality of second keys 323 in a left-right symmetric manner or perform detection in a left-right symmetric manner. However, no limitation is imposed herein in the present invention. In another implementation aspect, the second holder 324 may be disposed at any position on any side of the second base 321, as long as it is capable of providing the light source for the plurality of second keys 323, and the plurality of second keys 323 can be detected and irradiated. In addition, both the second light source module 34 and the third sensor 37 in this embodiment are disposed on the same second holder 324. However, no limitation is imposed herein in the present invention. The second light source module 34 and the third sensor 37 may further be respectively disposed at any position of the second base 321.

In this embodiment, the second sensor 36 and the third sensor 37 are cameras (or camera modules). The operating position data detected and obtained by the second sensor 36 and the operating position data detected and obtained by the third sensor 37 are respectively a first image and a second image that are obtained by photographing. The first image and the second image are transmitted to a computing device end by the control module 38. An analysis and calculation module additionally disposed on the computing device end analyzes the images, to obtain the first relative position data (that is, "data of relative positions between a finger/fingers of a user and the plurality of first keys 313") or the second relative position data (that is, "data of relative positions between a finger/fingers of a user and the plurality of second keys 323"). Because the second sensor 36 can correctly determine the first relative position data only when all first keys 313 are photographed, and the third sensor 37 can correctly determine the second relative position data only when all second keys 323 are photographed, a position of the second sensor 36 needs to be higher than a surface of any one of the first keys 313, and a position of the third sensor 37 needs to be higher than a surface of any one of the second keys 323.

The control module 38 is disposed in the second accommodating space 322, and is electrically connected to the plurality of first keys 313, the plurality of second keys 323, the first light source module 33, the second light source module 34, the first sensor 35, the second sensor 36, and the third sensor 37. Although the control module 38 herein is located in the second accommodating space 322, no limitation is imposed herein in the present invention. However, in another implementation aspect, the control module may further be disposed in the first accommodating space. In addition, although the control module 38 in this embodiment is disposed in the second accommodating space 322, the control module 38 can control, by using a wireless module, each element in the first keyboard 31 to be turned on or off, and can receive data detected and obtained by each element in the first keyboard 31. In another implementation aspect, the first keyboard and the second keyboard may further be connected in a wired manner. No limitation is imposed herein in the present invention. In addition, in some implementation aspects, a first control module may be disposed in the first keyboard, and a second control module may be disposed in the second keyboard, to respectively control operation of each element in the first keyboard and the second keyboard.

When determining that the ambient luminance detected by the first sensor 35 is equal to or greater than a preset ambient luminance, the control module 38 turns on the second sensor 36 and the third sensor 37, and receives the first operating position data of the second sensor 36 and the second operating position data of the third sensor 37. When determining that the ambient luminance detected by the first sensor 35 is less than the preset ambient luminance, the control module 38 turns on the first light source module 33 to provide the first light source for the plurality of first keys 313, or turns on the second light source module 34 to provide the second light source for the plurality of second keys 323, or simultaneously turns on the first light source module 33 and the second light source module 34.

The preset ambient luminance herein is an ambient luminance at which the second sensor 36 and the third sensor 37 can clearly detect and obtain the operating position data. The preset ambient luminance may be specified in advance, and pre-stored in the control module 38 to facilitate subsequent comparison and determining. The operating position data received by the control module 38 is merely images, which need to be analyzed by the computing device end.

Before starting to obtain the first operating position data and the second operating position data, the control module 38 needs to first determine whether the ambient luminance detected by the first sensor 35 is equal to or greater than the preset ambient luminance. If the ambient luminance detected by the first sensor 35 is equal to or greater than the preset ambient luminance, it indicates that the second sensor 36 and the third sensor 37 can clearly detect and obtain the operating position data. In this case, the control module 38 turns on the second sensor 36 and the third sensor 37 to start photographing and detect and obtain the first operating position data and the second operating position data. When the control module 38 determines that the ambient luminance detected by the first sensor 35 is less than the preset ambient luminance, it indicates that the image photographed by the second sensor 36 or the third sensor 37 may be excessively dark from which the first operating position data or the second operating position data cannot be detected and obtained. In this case, the control module 38 turns on the first light source module 33 to provide a light source for the plurality of first keys 313, or turns on the second light source module 34 to provide a light source for the plurality of second keys 323, or simultaneously turns on the first light source module 33 and the second light source module 34, to improve the ambient luminance of areas in which the plurality of first keys 313 and the plurality of second keys 323 are located.

In this way, the foregoing structure can resolve the problem of the insufficient ambient light source by using an automatic supplemental lighting technology on the left and right split keyboards. When the foregoing structure is applied to a head-up display, a head-mounted display, or a virtual reality display (VR) device, even if in a dark environment in which no lamp is turned on, a user can still type data with the keyboard device 30 by means of the automatic supplemental lighting technology in the this embodiment.

In this embodiment, after the second sensor 36 and the third sensor 37 are already turned on, keep photographing, and detect and obtain the first operating position data and the second operating position data, the control module 38 can learn whether the first operating position data includes the first relative position data, and whether the second operating position data includes the second relative position data. The first and second relative position data may be analyzed by the computing device end and then, transmitted back to the control module 38. Reference may be made to the descriptions about FIG. 5 in the following for details. Although the device in FIG. 5 is not the device of this embodiment, the principles are substantially the same. When neither the first operating position data nor the second operating position data includes the first relative position data and the second relative position data, it indicates that the user does not continue operating the keyboard device 30. In this case, the control module 38 turns off the second sensor 36 and the third sensor 37 and does not continue photographing or detecting and obtaining first operating position data and second operating position data. In this case, the second sensor 36 and the third sensor 37 may be turned off automatically when the user does not operate the keyboard device 30, or has not operated the keyboard device 30 for an idle time, to save power.

In addition, when the first light source module 33 or the second light source module 34 is in a turn-on state, and the ambient luminance detected by the first sensor 35 is equal to or greater than the preset ambient luminance, the control module 38 turns off the first light source module 33 or the second light source module 34. That is, when the first light source module 33 is in a turn-on state, or the second light source module 34 is in a turn-on state, or both the first light source module 33 and the second light source module 34 are in a turn-on state, the first sensor 35 keeps detecting an ambient luminance. When the ambient luminance detected by the first sensor 35 is greater than the preset ambient luminance, the control module 38 turns off the first light source module 33 and the second light source module 34. In this case, the ambient luminance has been improved, for example, the user has turned on an indoor lamp, and the ambient luminance detected by the first sensor 35 is greater than the preset ambient luminance, so that assistance from the light source of the first light source module 33 or the second light source module 34 is not needed. In this case, the control module 38 automatically turns off the first light source module 33 and/or the second light source module 34, to save power.

Figure 4:
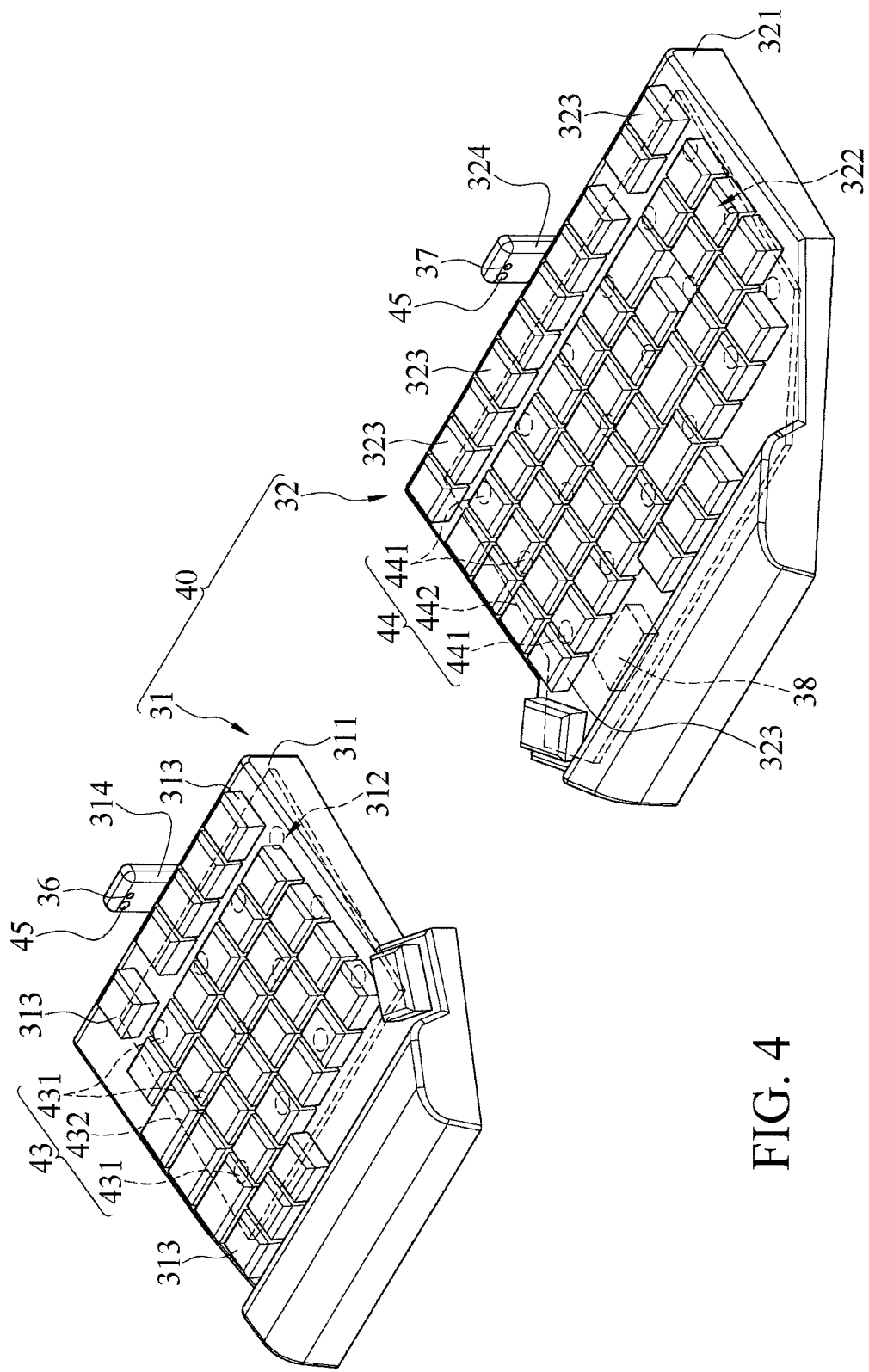
FIG. 4 is a schematic diagram of a keyboard device according to a fourth embodiment of the present invention.

Subsequently, referring to FIG. 4, FIG. 4 is a schematic diagram of a keyboard device 40 according to a fourth embodiment of the present invention. Elements and structures in this embodiment that are the same as those in the third embodiment are represented by using the same element symbols, and are not described in detail herein again. This embodiment is different from the third embodiment in that a keyboard device 40 in this embodiment includes a plurality of first light source modules, that is, first light source modules 43, and the plurality of first light source modules 43 is disposed in a first accommodating space 312 of a first base 311 and below the plurality of first keys 313 and can provide a first light source toward the plurality of first keys 313. In addition, there is a plurality of second light source modules, that is, second light source modules 44, and the plurality of second light source modules 44 is disposed in a second accommodating space 322 of the second base 321 and below the plurality of second key 323, and can provide a second light source toward the plurality of second keys 323.

The plurality of first light source modules 43 in this embodiment is a plurality of LED elements 431 that is disposed on a circuit board 432 and below the first keys 313. The plurality of second light source modules 44 is a plurality of LED elements 441 that is disposed on a circuit board 442 and below the second keys 323. In another implementation aspect, the plurality of light source modules may further be LED elements disposed beneath each keycap, or may be a plurality of LED elements disposed on a side of the accommodating space of the base, and enables, in cooperation with elements such as a light guide plate and a reflective plate, a light source to be emitted from the accommodating space toward the keys.

In addition, this embodiment is different from the third embodiment in that there are two first sensors 45. One of the first sensors 45 is disposed on the first base 311, and is, together with the second sensor 36, disposed on the first holder 314 in this embodiment. The other first sensor 45 is disposed on the second base 321, and is, together with the third sensor 37, disposed on the second holder 324 in this embodiment.

Further, first sensors 45 for detecting the plurality of first keys 313 and the plurality of second keys 323 are respectively disposed on the first keyboard 31 and the second keyboard 32 to detect an ambient luminance of the first keyboard 31 and an ambient luminance of the second keyboard 32, to obtain an ambient luminance value of each keyboard. In this way, the first light source module 43 and the second light source module 44 may be respectively controlled to be turned on or off, to obtain a required ambient luminance, so that the first light source module 43 and the second light source module 44 do not need to be simultaneously turned on, thereby achieving an effect of power saving.

In this embodiment, when determining that the ambient luminance detected by the first sensor 45 located on the first base 311 is less than a preset ambient luminance, the control module 38 successively turns on at least one of the plurality of first light source modules 43 until the control module 38 determines the ambient luminance detected by the first sensor 45 is equal to or greater than the preset ambient luminance, or until the plurality of first light source modules 43 is all turned on. That is, when determining that the current ambient luminance is insufficient, the control module 38 may first control one first light source module 43 to be turned on (controlling an LED element 431 to be turned on herein), to provide a light source. Subsequently, the control module 38 keeps receiving and determining the ambient luminance detected by the first sensor 45, and if the ambient luminance is still insufficient, the control module 38 further turns on a first light source modules 43 (controlling an LED element 431 to be turned on herein). The control module 38 does not stop further turning on first light source module 43 until determining that the ambient luminance detected by the first sensor 45 is equal to or greater than the preset ambient luminance. Alternatively, the control module 38 successively turns on first light source modules 43 until all of the first light source modules 43 are turned on. Although an example is used, in which one LED element is turned on at a time, for description herein, in another implementation aspect, two or more LED elements may be grouped into one group, so that two or more LED elements 431 can be turned on at a time.

Similarly, when determining that the ambient luminance detected by the first sensor 45 located on the second base 321 is less than the preset ambient luminance, the control module 38 successively turns on at least one of the plurality of second source modules 44, until the control module 38 determines that the ambient luminance detected by the first sensor 45 is equal to or greater than the preset ambient luminance, or the plurality of second light source modules 44 is all turned on. That is, when determining that the current ambient luminance is insufficient, the control module 38 may first control a second light source modules 44 to be turned on (controlling an LED element 441 to be turned on herein), to provide a light source. Subsequently, the control module 38 keeps receiving and determining the ambient luminance detected by the first sensor 45. If the ambient luminance is still insufficient, the control module 16 further turns on a second light source module 44 (controlling an LED element 441 to be turned on herein). The control module 38 does not stop further turning on a second light source module 44 until determining that the ambient luminance detected by the first sensor 45 is equal to or greater than the preset ambient luminance. Alternatively, the control module 38 successively turns on second light source modules 44 until all of the second light source modules 44 are turned on. Although an example is used, in which one LED element 441 is turned on at a time, for description herein, in another implementation aspect, two or more LED elements 441 may be grouped into a group, so that two or more LED elements 441 can be turned on at a time.

In this way, the control module 38 performs determination to turn on only first light source modules 43 or second light source modules 44 sufficient for required ambient luminance, and does not need to simultaneously turn on all first light source modules 43 or second light source modules 44 each time the ambient luminance is insufficient. Therefore, the keyboard device 40 in this embodiment not only can turn on sufficient first light source modules 43 or second light source modules 44 when necessary, but also can achieve an effect of power saving.

In addition, because there are two first sensors 45 that are respectively located on the first base 311 and the second base 321 in this embodiment, the ambient luminance of a plurality of first keys 313 and the ambient luminance of the second key 323 can be respectively detected. Therefore, when the first light source module 43 is in a turn-on state, and the ambient luminance detected by the first sensor 45 located on the first base 311 is equal to or greater than the preset ambient luminance, the control module 38 turns off the first light source module 43. Alternatively, when the second light source module 44 is in a turn-on state, and the ambient luminance detected by the first sensor 45 located on the second base 321 is equal to or greater than the preset ambient luminance, the control module 38 turns off the second light source module 44.

That is, when the first light source module 43 is in a turn-on state, or the second light source module 44 is in a turn-on state, or both the first light source module 43 and the second light source module 44 are in a turn-on state, the two first sensors 45 keep detecting an ambient luminance of the first keyboard 31 and an ambient luminance of the second keyboard 32, and respectively turns off the first light source module 43 or the second light source module 44 according to the ambient luminance detected by the first sensors 45. In this case, the ambient luminance has been improved, for example, the user has turned on an indoor lamp, and the ambient luminance detected by the first sensor 45 is greater than the preset ambient luminance, so that assistance from the light source of the first light source module 33 or the second light source module 34 is not needed. In this case, the control module 38 automatically turns off the first light source module 43 or the second light source module 44, to save power.

Figure 5:
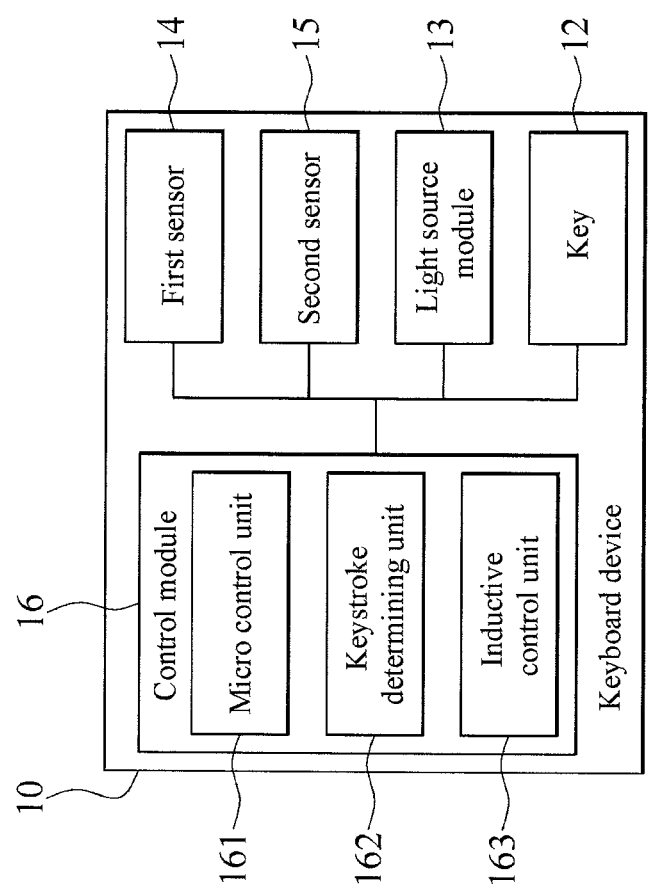
FIG. 5 is a systematic block diagram of the keyboard device according to the first embodiment of the present invention.

Referring to FIG. 5, FIG. 5 is a systematic block diagram of the keyboard device according to the first embodiment of the present invention. The control module 16 further includes a micro control unit 161, a keystroke determining unit 162, and an inductive control unit 163. The keystroke determining unit 162 is electrically connected to a contact (or referred to as key contact) corresponding to each key 12, and is configured to: detect whether the contact switches from a normally open state to a conductive state because of a keystroke, so as to generate a key scan code accordingly. The micro control unit 161 stores the key scan code into a keyboard buffer of the computing device end by using a keyboard driver, and sends an interruption request to a processor of the computing device. Subsequently, the processor in the computing device reads the key scan code from the buffer in response to the interruption request, to learn which key 12 is depressed. The "keystroke" includes depressing (Key Down) and releasing (Key Up) of a key. The forgoing is an acting procedure part of a keystroke on the keyboard in the present invention.

The inductive control unit 163 is electrically connected to the first sensor 14, the second sensor 15, and the light source module 13. The foregoing preset ambient luminance is stored in the inductive control unit 163. When the ambient luminance detected by the first sensor 14 is less than the preset ambient luminance, the inductive control unit 163 turns on the light source module 13 to provide a light source. When the detected ambient luminance is equal to or greater than the preset ambient luminance, the inductive control unit 163 turns on the second sensor 15 to start to detect and obtain the operating position data. The micro control unit 161 stores the operating position data detected and obtained by the second sensor 15 into the keyboard buffer of the computing device end by using the keyboard driver, and sends the interruption request to the processor in the computing device, to so that the processor in the computing device can read the operating position data from the buffer in response to the interruption request. Subsequently, the analysis and calculation module (that is, the keyboard driver) disposed on the computing device end analyzes the image data, to further obtain the relative position data. When the operating position data cannot be identified and analyzed because the images are excessively dark, the analysis and calculation module notifies the micro control unit 161, so that the inductive control unit 163 can turn on the light source module 13 to provide a light source or enhance the current light source. When the operating position data does not include the relative position data, the analysis and calculation module notifies the micro control unit 161, so that the inductive control unit 163 can turn off the second sensor 15 to stop detecting and obtaining the operating position data.

The foregoing described buffer uses the first-in first-out (FIFO) data structure. In some embodiments, the operating position data and the key scan code are respectively stored in two separate dedicated buffers, to enable the processor of the computing device to distinguish categories of the data when reading the data in the two buffers. In some embodiment, after the operating position data is stored into a dedicated buffer, the processor of the computing device is not notified by sending an interruption request, and instead, the processor of the computing device automatically reads, in a polling manner and at intervals, the buffer dedicated to the operating position data. Similarly, after the key scan code is stored in a dedicated buffer, the processor of the computing device may further read, in a polling manner and at intervals, the buffer dedicated to the key scan code.

Based on the above, the embodiments of the present invention provide a keyboard with a built-in sensor and light source module, which resolves a problem of an insufficient ambient light source. When it is detected that the ambient light source is insufficient, a second sensor (and a third sensor) may capture images with the aid of the automatic supplemental lighting technology, and a light source module and the sensors are controlled by using an automatic power saving function, to reduce power consumption of a power source, thereby overcoming the disadvantages in the prior art.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A keyboard device, comprising:
a base, comprising an accommodating space;
a plurality of keys, disposed in the accommodating space of the base;
at least one light source module, disposed on the base, and configured to provide a light source for the keys;
a first sensor, being a luminance sensor disposed on the base, and configured to detect an ambient luminance of the keys, to enable a second sensor to detect and obtain an operating position data, the operating position data comprising at least one image;
the second sensor, being a camera disposed on the base and facing the keys, and configured to detect and obtain the operating position data; and
a control module, disposed in the accommodating space of the base, and electrically connected to the keys, the at least one light source module, the first sensor, and the second sensor, wherein when determining that the ambient luminance detected by the first sensor is equal to or greater than a preset ambient luminance pre-stored in the control module, the control module turns on the second sensor and receives the operating position data of the second sensor, and when determining that the ambient luminance detected by the first sensor is less than the preset ambient luminance, the control module turns on the at least one light source module to provide the light source for the keys; and, wherein when learning that the operating position data does not comprise a relative position data, the control module turns off the second sensor, and the relative position data is a data of relative positions between at least one finger and the keys.

2. The keyboard device according to claim 1, wherein the at least one light source module is disposed in the accommodating space of the base, is located below the keys, and provides the light source toward the keys.

3. The keyboard device according to claim 1, wherein the at least one light source module is disposed on an outer side of the base, and provides the light source toward surfaces of the keys.

4. The keyboard device according to claim 1, wherein when the at least one light source module is in a turn-on state, and when the ambient luminance detected by the first sensor is greater than the preset ambient luminance, the control module turns off the at least one light source module.

5. The keyboard device according to claim 1, wherein the second sensor is disposed on an outer side of the base, and a position of the second sensor is higher than a surface of any one of the keys.

6. The keyboard device according to claim 1, wherein the at least one light source module comprises a plurality of light source modules, and when determining that the ambient luminance detected by the first sensor is less than the preset ambient luminance, the control module successively turns on at least one of the light source modules until the control module determines that the ambient luminance detected by the first sensor is equal to or greater than the preset ambient luminance, or all of the light source modules are turned on.

7. A keyboard device, comprising:
a first keyboard, comprising:
a first base that comprises a first accommodating space, and a plurality of first keys, wherein the first keys are disposed in the first accommodating space;
a second keyboard, comprising:
a second base that comprises a second accommodating space, and a plurality of second keys, wherein the second keys are disposed in the second accommodating space;
at least one
first light source module, wherein the at least one first light source module is disposed on the first base, and is configured to provide a first light source for the first keys;
at least one second light source module, wherein the at least one second light source module is disposed on the second base, and is configured to provide a second light source for the second keys;
at least one first sensor, being a luminance sensor disposed on the first base or the second base, and configured to detect an ambient luminance of the first keys and the second keys, to enable a second or third sensor to detect and obtain operating position data;
the second sensor, being a camera disposed on the first base and facing the first keys, and configured to detect and obtain the first operating position data, wherein the first operating position data comprises at least one first image;
the third sensor, being a camera disposed on the second base and facing the second keys, and configured to detect and obtain a second operating position data, the second operating position data comprises at least one second image; and
a control module, disposed in the first accommodating space or the second accommodating space, and electrically connected to the first keys, the second keys, the at least one first light source module, the at least one second light source module, the at least one first sensor, the second sensor, and the third sensor, wherein when determining that the ambient luminance detected by the at least one first sensor is equal to or greater than a preset ambient luminance pre-stored in the control module, the control module turns on the second sensor and the third sensor, and receives the first operating position data of the second sensor and the second operating position data of the third sensor, and when determining that the ambient luminance detected by the at least one first sensor is less than the preset ambient luminance, the control module turns on the at least one first light source module to provide the first light source for the first keys, or turns on the at least one second light source module to provide the second light source for the second keys; and, wherein when learning that the first operating position data does not comprise a first relative position data, and that the second operating position data does not comprise a second relative position data, the control module turns off the second sensor and the third sensor, the first relative position data is a data of relative positions between at least one finger and the keys.

8. The keyboard device according to claim 7, wherein the at least one first sensor is a luminance sensor, and the second sensor and the third sensor each are a camera.

9. The keyboard device according to claim 7, wherein the at least one first light source module is disposed in the first accommodating space of the first base, is located below the first keys, and provides the first light source toward the first keys, and the at least one second light source module is disposed in the second accommodating space of the second base, is located below the second keys, and provides the second light source toward the second keys.

10. The keyboard device according to claim 7, wherein the at least one first light source module is disposed on an outer side of the first base, and provides the first light source toward surfaces, and the at least one second light source module is disposed on an outer side of the second base, and provides the second light source toward the second keys.

11. The keyboard device according to claim 7, wherein when the at least one first light source module or the at least one second light source module is in a turn-on state, and the ambient luminance detected by the at least one first sensor is equal to or greater than the preset ambient luminance, the control module turns off the at least one first light source module or the at least one second light source module.

12. The keyboard device according to claim 7, wherein the at least one first sensor comprises two first sensors, one of the two first sensors is disposed on the first base, and the other of the two first sensors is disposed on the second base.

13. The keyboard device according to claim 12, wherein when the at least one first light source module is in a turn-on state, and the ambient luminance detected by the first sensor located on the first base is equal to or greater than the preset ambient luminance, the control module turns off the at least one first light source module, or when the at least one second light source module is in the turn-on state, and the ambient luminance detected by the first sensor located on the second base is equal to or greater than the preset ambient luminance, the control module turns off the at least one second light source module.

14. The keyboard device according to claim 7, wherein the second sensor is disposed on an outer side of the first base, and a position of the second sensor is higher than a surface of any one of the first keys, and the third sensor is disposed on an outer side of the second base, and a position of the third sensor is higher than a surface of any one of the second keys.

15. The keyboard device according to claim 7, wherein the at least one first light source module comprises a plurality of first light source modules, the at least one second light source module comprises a plurality of second light source modules, when the control module determines that the ambient luminance detected by the at least one first sensor is less than the preset ambient luminance, the control module successively turns on at least one of the first light source modules and the second light source modules until the control module determines that the ambient luminance detected by the at least one first sensor is equal to or greater than the preset ambient luminance, or all of the first light source modules and all of the second light source modules are turned on.

* * * * *